United States Patent
Ukai et al.

Patent Number: 5,796,457
Date of Patent: Aug. 18, 1998

[54] TN LIQUID CRYSTAL DISPLAY PANEL WITH THE DIFFERENCE BETWEEN THE PRODUCT OF THE FIRST RETARDATION FILM AND THE SECOND RETARDATION IS IN THE RANGE OF $0 < \Delta R \leq 50$ NM

[75] Inventors: Yasuhiro Ukai, Kobe; Takao Unate, Sakai; Mitsuru Takigawa, Kobe, all of Japan

[73] Assignee: Hosiden Corporation, Osaka, Japan

[21] Appl. No.: 542,184

[22] Filed: Oct. 12, 1995

[30] Foreign Application Priority Data

Oct. 19, 1994 [JP] Japan ................... 6-253365

[51] Int. Cl.⁶ ............................... G02F 1/1335
[52] U.S. Cl. ............... 349/119; 349/117; 349/96; 349/121
[58] Field of Search ................ 349/117–119, 121

[56] References Cited

U.S. PATENT DOCUMENTS

| | | |
|---|---|---|
| 5,184,236 | 2/1993 | Miyashita et al. ............... 359/63 |
| 5,227,903 | 7/1993 | Miyazawa et al. ............... 349/118 |
| 5,396,355 | 3/1995 | Wada et al. ..................... 349/117 |
| 5,440,413 | 8/1995 | Kikuchi et al. ................. 349/118 |

FOREIGN PATENT DOCUMENTS

| | | |
|---|---|---|
| 0 367 616 | 5/1990 | European Pat. Off. . |
| 6-194647 | 12/1992 | Japan . |

*Primary Examiner*—William L. Sikes
*Assistant Examiner*—Julie Ngo
*Attorney, Agent, or Firm*—Pollock, Vande Sande & Priddy

[57] ABSTRACT

A TN type liquid crystal cell is interposed between a pair of polarization plates. First and second retardation films each having slow axes orthogonal to each other are disposed between one of the polarization plates and the liquid crystal cell. The product $\Delta n_1 \times d_1$ of the refractive index anisotropy $\Delta n_1$ and the thickness $d_1$ of the first retardation film on the side of one of the polarization plates is set to a value greater than the product $\Delta n_2 \times d_2$ of the refractive index anisotropy $\Delta n_2$ and the thickness $d_2$ of the second retardation film. The viewing angle of the liquid crystal display panel in the left-right direction is expanded by this arrangement.

2 Claims, 3 Drawing Sheets

TN LIQUID CRYSTAL DISPLAY PANEL WITH THE DIFFERENCE BETWEEN THE PRODUCT OF THE FIRST RETARDATION FILM AND THE SECOND RETARDATION IS IN THE RANGE OF $0<\Delta R\leq 50$ NM

FIELD OF THE INVENTION

The present invention relates to a TN type liquid crystal display panel, and more particularly, to a transmission type liquid crystal display panel whose viewing angle characteristics are improved by interposing two retardation films each having slow axes nearly orthogonal to each other between a polarization plate and a liquid crystal cell.

BACKGROUND ART

In a TN (Twisted Nematic) type liquid crystal display panel, as shown in FIG. 1 (known in the prior art and also used in the present invention), a pair of polarization plates 11 and 15, having polarization 1a and 5a, are provided and a TN liquid crystal cell 14 is interposed between plates 11 and 15. In order to improve the viewing angle characteristics, a TN type liquid crystal display panel wherein two retardation films 12 and 13 having slow axes 2a and 3a nearly orthogonal to each other are interposed between one of the polarization plates, 11, and the liquid crystal cell, 14 is proposed in the Japanese Patent Application Laid open No. 2-125224. The direction of slow axis 3a of the retardation film 13 adjacent to the liquid crystal cell 14 is set nearly equal to the direction 4a of liquid crystal molecular orientation on the surface of the liquid crystal cell 14 facing to the retardation film 13.

In the display panel disclosed in the above patent application, each product $\Delta n \times d$ (referred to as retardation) of refractive index anisotropy $\Delta n$ and thickness d for retardation films 12 and 13 is equally set to each other.

The viewing angle characteristics for both left-right directions (i.e. horizontal directions) and upper-lower directions (i.e. vertical directions) can be improved to some extent by this prior art arrangement. However, the viewing angle characteristics for left-right directions are more important than that for upper-lower directions for a display used in a cockpit of an aircraft. Therefore, there are strong requirements for a liquid crystal display panel whose viewing angle characteristics for left-right direction are further improved.

SUMMARY OF THE INVENTION

It is an object of the present invention to provide a liquid crystal display panel whose viewing angle characteristics for left-right directions are further improved in order to respond to those requirements.

According to the present invention, in a liquid crystal display panel, a TN type liquid crystal cell is interposed between a pair of polarization plates, first and a second retardation films each having slow axes nearly orthogonal the each other are further interposed between one of the polarization plates and the liquid crystal cell with the second retardation film being positioned on the liquid crystal side, just as in the prior art but, in contrast to the prior art, in the present invention the product $\Delta n_1 \times d_1$ of the refractive index anisotropy $\Delta n_1$ and the thickness $d_1$ of the first retardation film is set greater than the product $\Delta n_2 \times d_2$ of the refractive index anisotropy $\Delta n_2$ and the thickness $d_2$ of the second retardation film.

In the present invention, it is desirable that the product $\Delta n \times d$ of the refractive index anisotropy $\Delta n$ and the thickness d of TN type liquid crystal cell be set in the range of $470\pm200$ nm.

In the present invention, it is desirable that the difference between the product of the refractive index anisotropy and the thickness of the first retardation film and the product of the refractive index anisotropy and the thickness of the second retardation film, $\Delta R = \Delta n_1 \times d_1 - \Delta n_2 \times d_2$, is set in the range $0 < \Delta R \leq 50$ nm.

DETAIL DESCRIPTION OF THE PREFERRED EMBODIMENT

Figure 1:
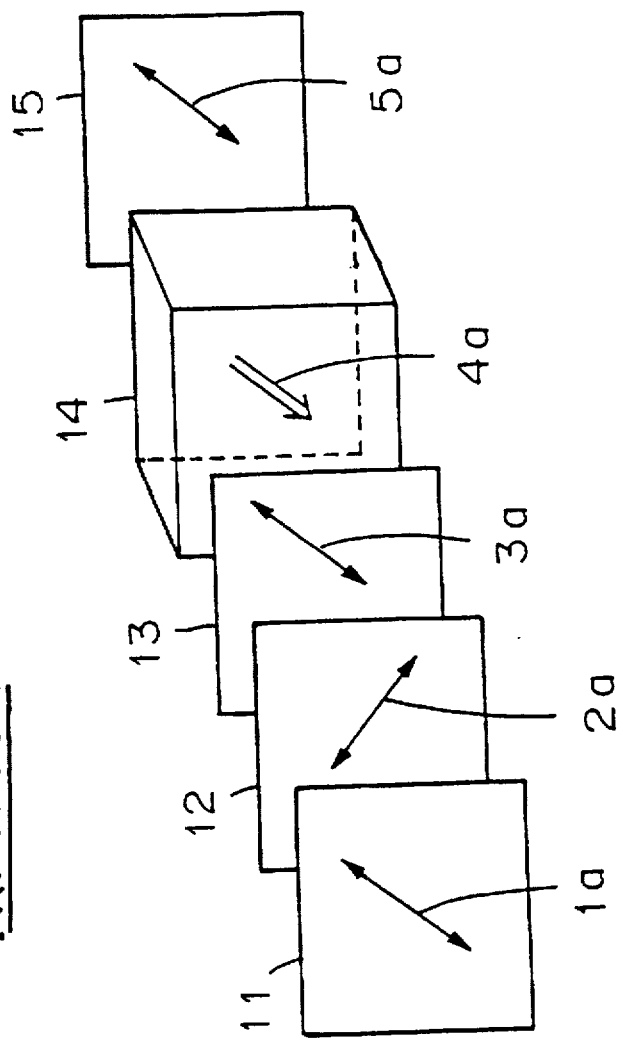
FIG. 1 is an oblique viewing diagram showing a prior art arrangement that is used in an embodiment of the present invention.

The TN type display panel of the present invention is arranged physically, like the prior art, as shown in FIG. 1. The duplicated explanation for FIG. 1 is omitted.

In contrast to the prior art, a feature of the present invention is to set the product $\Delta n_1 \times d_1$ of the refractive index anisotropy $\Delta n_1$ and the thickness $d_1$ of the first retardation film 21 greater than the product $\Delta n_2 \times d_2$ of the refractive index anisotropy $\Delta n_2$ and the thickness $d_2$ of the second retardation film 13. By such a setting, as shown by the contrast of vertical axis versus the viewing angle of horizontal axis in FIGS. 2 and 4, the viewing angle is expanded and the characteristics are improved compared with the prior art example where the retardation $\Delta n \times d$ is set to the same value for the two retardation films 12 and 13.

Figure 2:
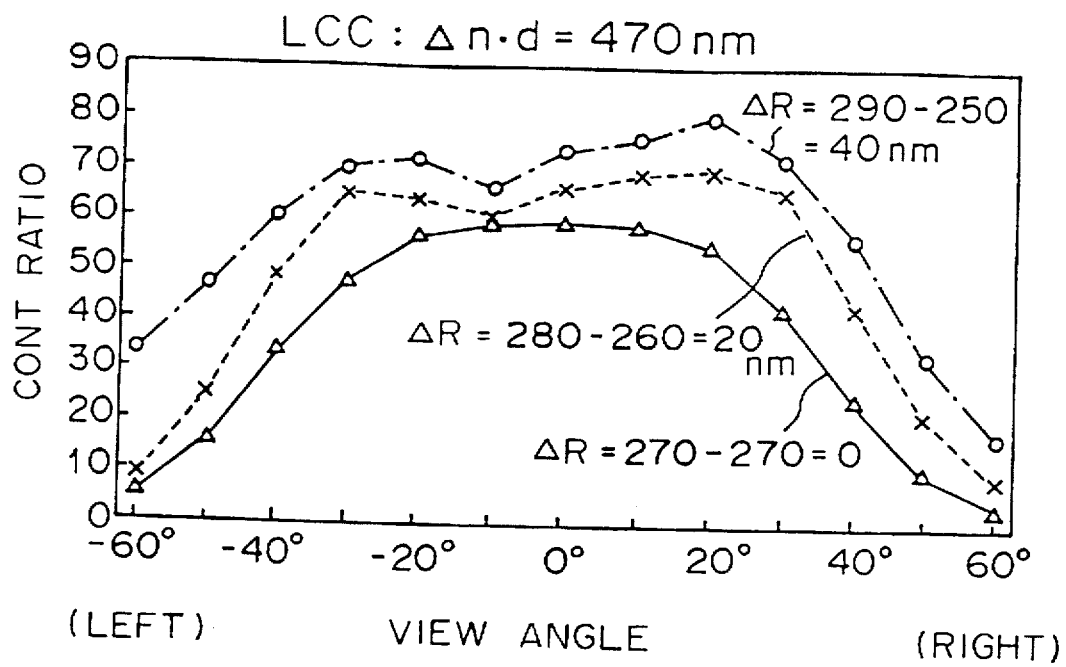
FIG. 2 is a graph which compares the viewing angle characteristics in left-right directions in the prior art arrangement and in the present invention.
Figure 4:
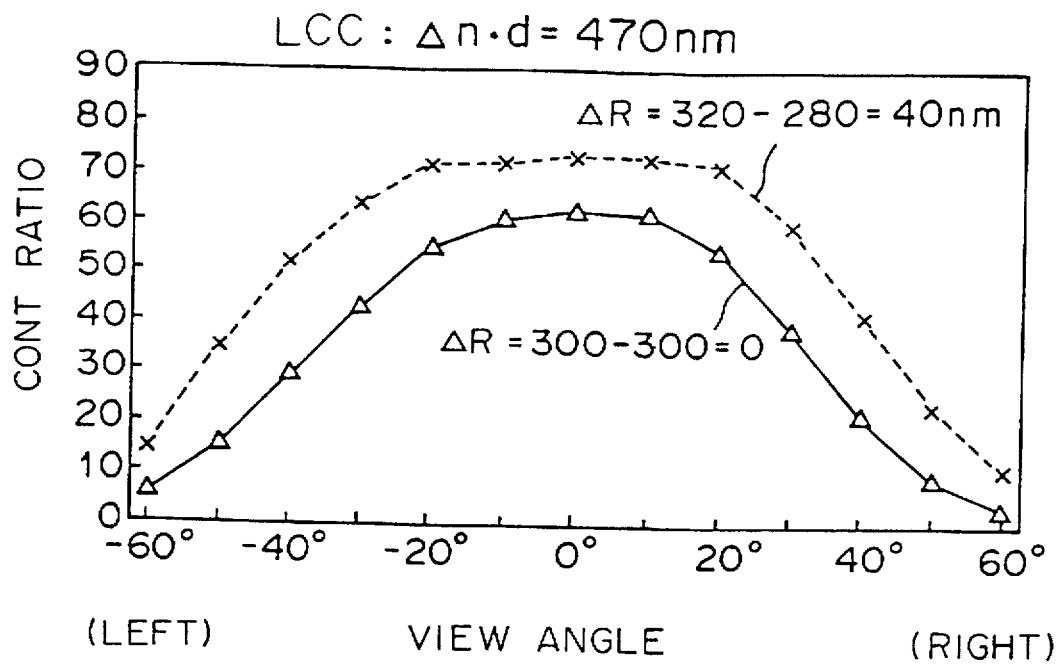
FIG. 4 is a graph showing another comparison between the viewing angle characteristics in left-right directions in the prior art arrangement and in the present invention.

In FIG. 2, the cases of $\Delta R = \Delta n_1 \times d_1 - \Delta n_2 \times d_2 = 270-270=0$, $\Delta R=280-260=20$ nm and $\Delta R=290-250=40$ nm are shown. In FIG. 4, the cases of $\Delta R=300-300=0$ and $\Delta R=320-280=40$ nm are shown. Regarding the viewing angle characteristics in left-right directions, the case of $\Delta R=40$ nm in the present invention is the best and the case of $\Delta R=20$ in the present invention is the second best compared with the prior art case of $\Delta R=0$.

Figure 3:
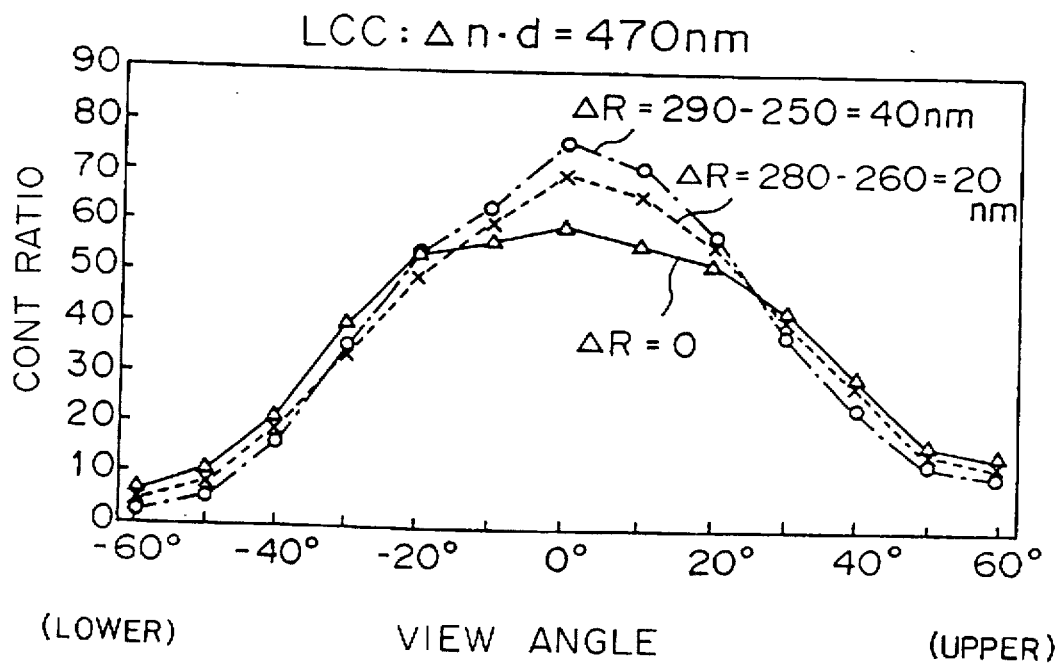
FIG. 3 is a graph (corresponding to FIG. 2) which compares the viewing angle characteristics in upper-lower direction in the prior art arrangement of FIG. 1 and in the present invention.
Figure 5:
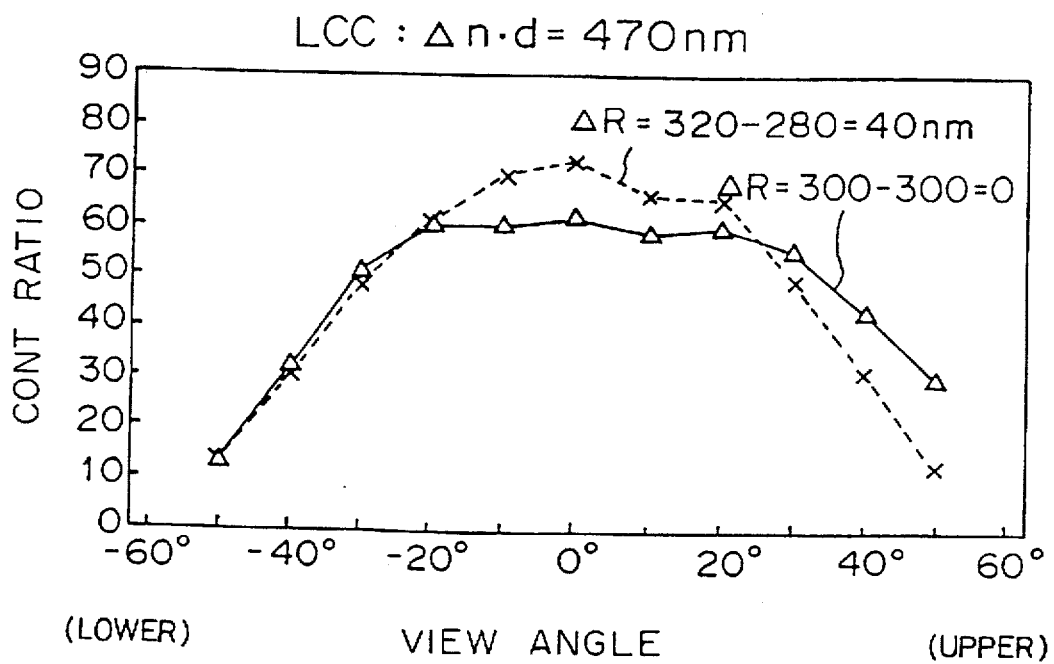
FIG. 5 is a graph showing another comparison (corresponding to FIG. 4) of the viewing angle characteristics in upper-lower directions between the prior art arrangement and the present invention.

On the other hand, regarding the viewing angle characteristics in upper-lower direction, as shown in FIG. 3 (corresponding to FIG. 2) and FIG. 5 (corresponding to FIG. 4), the case of $\Delta R=20$ nm is about the same level as or slightly worse than the case of $\Delta R=0$ and the case of $\Delta R=40$ nm is slightly worse than the case of $\Delta R=0$. Actually, from many experiments, it has been confirmed that the viewing angle characteristics in left-right directions improves as $\Delta R$ increases while the viewing angle characteristics in upper-lower direction inversely deteriorates as $\Delta R$ increases. Practically, it is appreciated that $\Delta R$ of $0<\Delta R\leq 50$ nm is desirable.

Incidentally, it is desirable that the product (retardation) $\Delta n \times d$ of the refractive index anisotropy $\Delta n$ and the thickness d of the TN type liquid crystal cell 14 be set in the range of 470±200 nm although this is not specified in a prior art example. The reason is that this range of ΔR indicates the best optical characteristics including viewing angle characteristics. Incidentally, this has been well known.

As mentioned above, in the present invention, by setting the retardation (Δn×d) of the first retardation film 12 interposed between one polarization plate 11 and the liquid crystal cell 14 greater than that of the second retardation film 13, the viewing angle characteristics in left-right direction can be improved compared with the prior art case where the same retardation value is set for both retardation films. Therefore, an LCD preferable for display used in a cockpit of an aircraft can be provided by the present invention.

Having thus described our invention, we claim:

1. In a liquid crystal display panel of the type having a Twisted Nematic type liquid crystal cell interposed between a pair of polarization plates and first and second retardation films each having slow axes nearly orthogonal to each other interposed between one of the polarization plates and said liquid crystal cell such that said first and second retardation films face said one of the polarization plates and said liquid crystal cell, respectively, the improvement wherein:

the product $\Delta n_1 d_1$ of the refractive index anisotropy $\Delta n_1$ and the thickness $d_1$ of said first retardation film which faces said one of said polarization plates is set to a value greater than the product $\Delta n_2 d_2$ of the refractive index anisotropy $\Delta n_2$ and the thickness $d_2$ of said second retardation film which faces said liquid crystal cell;

the product $\Delta nd$ of the refractive index anistopy $\Delta n$ and the thickness d of said TN type liquid crystal cell is set in the range of 470±200 nm; and the difference between the products of the respective refractive index and thicknesses of said first and second retardation films, $\Delta_R = \Delta n_1 d_1 - \Delta n_2 d_2$, is set in the range of $0 < \Delta_R \leq 50$ nm.

2. The liquid crystal display panel according to claim 1, characterized in that a direction of the slow axis of said second retardation film is arranged to match the liquid crystal orientation direction on the surface of said liquid crystal cell facing said second retardation film.

\* \* \* \* \*